United States Patent [19]
Barger et al.

[11] Patent Number: 5,479,162
[45] Date of Patent: Dec. 26, 1995

[54] AIRCRAFT ANTI-THEFT SYSTEM

[75] Inventors: Randall R. Barger, Largo; Thomas V. Saliga, Tampa, both of Fla.

[73] Assignee: United Beechcraft, Inc., Wichita, Kans.

[21] Appl. No.: 89,299

[22] Filed: Jul. 9, 1993

[51] Int. Cl.$^6$ .................................................. G08B 21/00
[52] U.S. Cl. ..................... 340/945; 340/825.31; 340/538; 340/310.01; 307/10.3; 307/10.4
[58] Field of Search ...................... 340/945, 541, 340/426, 428, 430, 310.02, 310.03, 538, 825.31, 825.32; 307/10.3, 10.4, 10.5, 10.6; 361/171, 172; 180/270, 287

[56] References Cited

U.S. PATENT DOCUMENTS

| | | | |
|---|---|---|---|
| 4,463,340 | 7/1984 | Adkins et al. | 340/538 |
| 4,494,114 | 1/1985 | Kaish | 340/825.31 |
| 4,567,511 | 1/1986 | Smith et al. | 340/310.02 |
| 4,604,708 | 8/1986 | Lewis | 340/825.31 |
| 4,736,113 | 4/1988 | Leu | 340/426 |
| 4,754,255 | 6/1988 | Sanders et al. | 340/528 |
| 4,891,971 | 1/1990 | Jones et al. | 340/959 |
| 5,041,810 | 8/1991 | Gotanda | 340/426 |
| 5,043,720 | 8/1991 | Laurienzo | 340/528 |
| 5,049,867 | 9/1991 | Stouffer | 340/426 |
| 5,111,185 | 5/1992 | Kozaki | 340/568 |
| 5,159,344 | 10/1992 | Robinson et al. | 340/426 |
| 5,254,970 | 10/1993 | Brady | 340/528 |
| 5,260,974 | 11/1993 | Johnson et al. | 375/76 |
| 5,280,268 | 1/1994 | Mathews | 340/426 |
| 5,304,979 | 4/1994 | Lima et al. | 340/428 |

OTHER PUBLICATIONS

Ignition/Starter Disabler, item No. 12XX8415Y, J. C. Whitney & Co. Catalog No. 554J, p. 61, 1993.

*Primary Examiner*—John K. Peng
*Assistant Examiner*—Benjamin C. Lee
*Attorney, Agent, or Firm*—David Kiewit

[57] ABSTRACT

An anti-theft system that can be retrofitted onto existing aircraft disables the starter motor of an engine or engines a predetermined time after the aircraft is taken out of service and re-enables starting only after the pilot has provided adequate identification (e.g. by entering a personal identification number at a cockpit keyboard). The predetermined time interval is selected to be long enough to ensure that the system does not impose a flight hazard by preventing in-flight re-starts. In a preferred version of the system, a drop in the output voltage of the aircraft's main electric power system is used as an indication that the aircraft is out of service. To simplify installation on existing aircraft, the system provides for communication among various functional elements over a pre-existing part of the aircraft (e.g. by imposing AC tones on a starter motor control line).

8 Claims, 6 Drawing Sheets

AIRCRAFT ANTI-THEFT SYSTEM

BACKGROUND OF THE INVENTION

This invention provides system and apparatus for preventing theft of an aircraft. The system includes both access code input apparatus and starter motor interlock apparatus that prohibits an engine of the aircraft from starting unless the proper code has been supplied.

Theft prevention systems that prevent starting or operation of a vehicle are well known in the art and include the Catalog Number 12XX8415Y sold by J. C. Whitney and Company, 1917 Archer Avenue, Chicago, Ill. 60680. The 12XX8415Y system automatically disables an automobile's starter motor or ignition system whenever the ignition is turned off, and requires the driver to use a keyboard to enter a four digit secret code before re-starting the car. If a thief cuts the wire between the keyboard unit and the portion of the system located at the starter motor, the vehicle remains in a disabled state.

Other teachings of theft deterrent systems and apparatus that use a secret code or personal identification number ("PIN") are provided in several U.S. patents, including:

U.S. Pat. No. 5,111,185—Wherein Kozaki teaches a multi-password anti-theft system for preventing the theft of individual items of a multi-component automobile entertainment system.

U.S. Pat. No. 4,495,114—Wherein Kaish teaches a password-based system for automatically disabling microprocessor controlled electronic equipment when a key event occurs (e.g. when a radio is removed from an automobile). In Kaish's system the user has the option of changing the password.

Applying any of the prior art systems that have been developed for automobiles to an aircraft poses a serious safety consideration that does not occur in land vehicles. Any aircraft system or apparatus that can disable the operation of a starter motor, or that can shut down an engine, must be designed so as to minimize or eliminate the risk that the system could inadvertently disable the aircraft while it is flying. Jones et al, in U.S. Pat. No. 4,891,971, provide a system and apparatus that automatically prevents abnormal start-up of an aircraft turbine engine. Jones et al's system uses inputs from either an airspeed sensor or from a "squat switch" that is connected to the aircraft's landing gear to indicate that the airplane is on the ground before aborting an abnormal start-up. The disclosure of Jones et al is herein incorporated by reference.

Retrofitting an anti-theft system to an existing aircraft has additional complications that are not encountered in similar systems used on land vehicles. One source of complexity and additional cost of installation is posed by the difficulty of routing the necessary electric wiring from the cockpit or passenger compartment portion of an aircraft to the engine compartment or nacelle. This can be particularly difficult in multi-engine fixed-wing aircraft, in which the wiring is run through the wing. Another source of complexity is posed by the requirement, in modern aircraft that have a pressurized cabin, of ensuring that any new penetration of a bulkhead (e.g. running a wire from the instrument panel to an engine) does not introduce an air leak that could affect the cabin pressurization system.

Prior art approaches to using pre-existing wiring to send data and commands are well known. Teaching of this is found, inter alia, in Smith and Laxton in U.S. Pat. No. 4,567,511.

SUMMARY OF THE INVENTION

It is an object of the invention to provide a system and apparatus that can be economically retrofitted to an existing aircraft for preventing the unauthorized use of that aircraft.

It is a further object of the invention to provide a multi-microprocessor vehicle anti-theft system that employs an inherent portion of the vehicle's structure or pre-existing vehicle apparatus (e.g. the electrical power wiring) for communication of data and commands between ones of the microprocessors.

It is a yet a further object of the invention to provide an anti-theft system that may be retrofitted to a multi-engine airplane with a pressurized cabin, where the retrofit can be done without penetrating a bulkhead that separates the cabin from any other portion of the airplane's structure. It is specifically an object of the invention to provide such a retrofittable system that includes control apparatus that may be installed within the wing of an aircraft so that such control elements are relatively inaccessible to any thief who might wish to bypass the system. It is a further specific object of the invention to provide such a system that alerts an operator of an earlier failed attempt to start the aircraft.

It is an additional object of the invention to provide an aircraft anti-theft system that disables an aircraft it the aircraft is on the ground, but that does not affect a pilot's ability to make an in-flight restart.

It is yet a further object of the invention to provide an aircraft anti-theft system that prevents unauthorized starting of an aircraft engine while that aircraft is on the ground, but that does not require electrical connection to a separate sensor (e.g. a squat switch or an airspeed sensor) in order to ascertain that a requested start-up may safely be interrupted.

It is a further object of the invention to provide an aircraft anti-theft system that uses a stored energy supply to automatically arm itself at the end of an aircraft glith operation, and wherein the stored energy supply has a expected service life that exceeds that of the protected aircraft.

DETAILED DESCRIPTION

Figure 1:
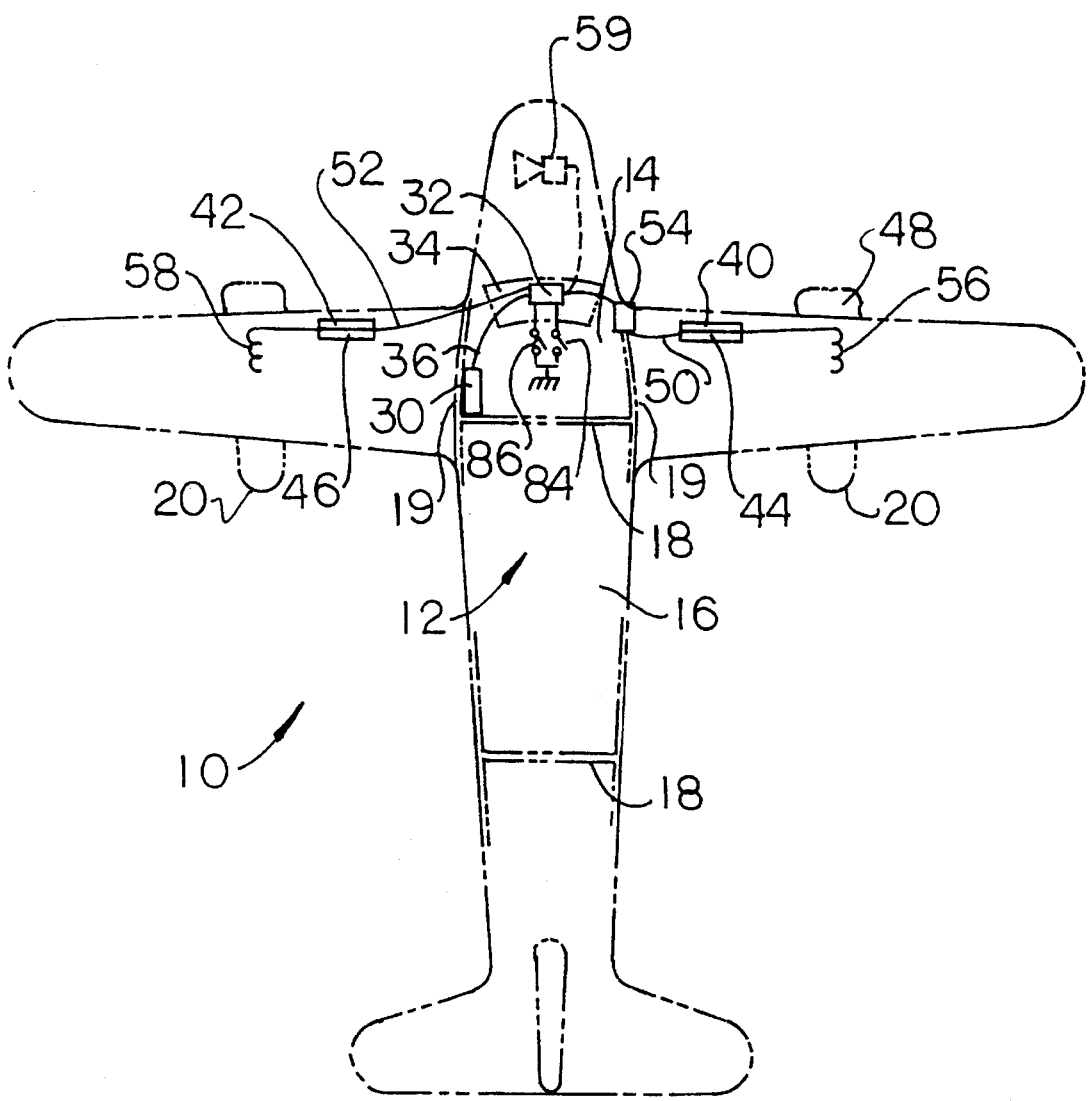
FIG. 1 of the drawings is an elevational view of a twin-engine aircraft showing the locations of major elements of the system.

Turning initially to FIG. 1 of the drawing, one finds a security system of the invention installed on a twin engine airplane 10, which is shown in phantom. The aircraft includes a cabin 12, which may consist of only a cockpit 14, or which may have a cockpit or flight deck 14 that is separated from one or more passenger or cargo compartments 16 by one or more interior bulkheads 18. An aircraft on which the security system of the invention may be installed also includes one or more engines 20 (which may be piston, turboprop, or jet engines) that are separated from the cabin 12 of the aircraft by one or more exterior bulkheads 19. Although FIG. 1 illustrates a fixed-wing, twin-engine aircraft with a pressurized passenger compartment 16 that is separated from an engine 20 by a pressurized bulkhead 19, it will be noted that the system of the invention is applicable to a broad range of other aircraft types (e.g. fixed or rotary wing, with one, two, or more engines) that may or may not have a pressurized cabin.

The interconnection of various elements of the system of the invention are also illustrated in FIG. 1 of the drawing. An operator identification apparatus, preferably a keyboard/display unit ("KBU") 30, which is used to allow an operator to input an access code, as well as for display of system information, is located at a convenient location within the cabin 12. A preferred location is next to the pilot's seat. A cockpit junction unit ("CJU") 32, may also be positioned at a convenient location in the cabin 12, e.g. tied to a multi-cable bundle of the aircraft's pre-existing wiring harness that is behind the instrument panel 34. Although the keyboard unit 30 and cockpit junction unit 32 are shown as separate physical entities in the view of FIG. 1, it will become apparent from the subsequent discussion that this choice is made for convenience in retrofitting the system of the invention to some pre-existing aircraft. In some cases the keyboard unit 30 and cockpit junction units can be combined within one housing, in which case the cable 36 that is shown as linking them can be omitted.

The security units 40, 42 and bypass units 44, 46 associated with each engine 20 are preferably installed at a relatively inaccessible location within the airplane's wing. This practice prevents a thief from being able to easily bypass the security unit and thereby cause an engine 20 to start. If it were not for this consideration, these units could also be installed in the engine compartment or nacelle 48. In the subsequent discussion, the security units 40, 42 and bypass units 44, 46, will sometimes be described as having a location intermediate the engine 20 and the cabin 12. It may be noted that in some embodiments the functional elements in the security and the bypass unit or units could be enclosed in a single housing, which would then be referred to as a security unit.

A communication path that is part of the pre-existing aircraft is provided by starter control lines 50, 52 that are part of the factory-installed wiring harness of the aircraft and that are used to connect the in-cabin (e.g. the keyboard unit 30 and cockpit junction unit 32) portions of the system with the security units 40, 42 and bypass units 44, 46. A conducting path, in the simplest case of single engine aircraft with an un-pressurized cabin, may be no more than a single wire connecting a start switch on the instrument panel 34 with a starter relay on the starter motor. In multi-engine aircraft that have a pressurized cabin, a starter control line often consists of a series-connected plurality of conductors and may comprise: a wire that connects a start switch 84 to a sealed connector 54 in an external bulkhead 19; a pin within the bulkhead connector; a second wire running from the bulkhead through the wing to a nacelle; an unsealed connector at the nacelle; and a wire from that connector to the starter motor relay. The use of a pre-existing starter control line as a wiring element of the system of the invention provides a substantial economic benefit during installation, as no additional wires have to be laboriously added to cable runs in a wing and, more importantly, because no new penetration of an external bulkhead or other wall of the pressurized cabin is needed.

It should be noted that although the preferred communication system of the invention uses the pre-existing starter wiring as a physical communication path, other parts or features of the aircraft could also be used without imposing a need to run additional wiring. Other communication arrangements that could be used for the relatively low information bandwidth required for the present system include transmission of acoustic or electrical excitations imposed on the airframe, and transmission of acoustic signals via hydraulic lines.

FIG. 1 of the drawing shows a single start relay 56, 58 associated with each of two engines. Each relay is shown as being respectively controlled by a security unit 40, 42 and an associated bypass unit 44, 46. It will be understood to those skilled in the art that relays may be "stacked" so that the output of a low current relay controls a higher current relay until one reaches a relay having a current handling capability commensurate with the starting current requirements of an electric starting motor. Thus, there may be more, or fewer, relays than are shown in FIG. 1. Moreover the various relays may be a mixture of conventional electromechanical relays, and (especially for the lower current elements of a relay "stack") solid state electronic relays.

A siren 59, shown in phantom in FIG. 1 of the drawing, may be added to the system, but is not an integral part of it.

Figure 2:
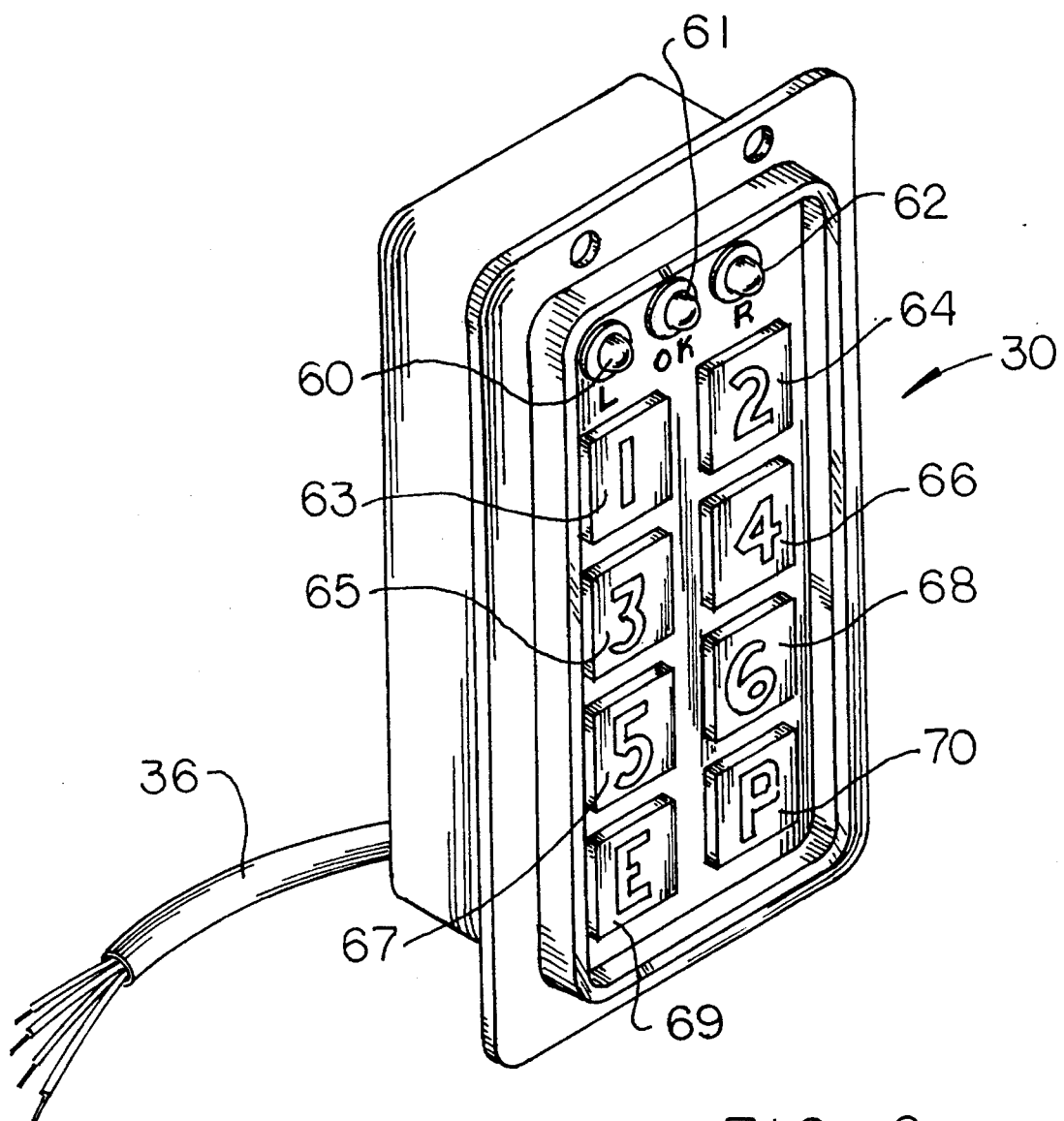
FIG. 2 of the drawings is an elevational view of a preferred keyboard/display embodiment of the operator identification apparatus of the invention.

Turning now to FIG. 2 of the drawing, one finds an elevational view of a keyboard and display module 30 that is representative of the preferred embodiment of an operator identification apparatus for a twin-engine aircraft. The illustrated module 30 has three indicator LEDs 60, 61, 62, six illuminated numeric keys 63–68, and two functions keys 69, 70 respectively labelled "E" and "P". As will be apparent from the ensuing discussion, other numbers of keys, or labelling schemes for the keys (e.g. letters of an alphabet) could be used without departing from the invention. It should be noted that although the preferred embodiment of the invention employs a keyboard, other operator-identification apparatus providing individual identification parameters usable in computer-based systems are known to the art and could be substituted for this keyboard. Other known methods include, inter alia, fingerprint readers, automated voice recognition ("voiceprint") equipment, readers for punched cards, readers for magnetically striped cards that are commonly used for credit cards, or computer input devices to interrogate "smart" cards that contain computer memory devices.

Numeric keys 63–68 are preferably used in conjunction with the "E" key 69 to "Enter" an access code or personal identification number ("PIN"). As is well known in the keyboard art, the "E" key 69 could be labelled "Enter", "OK", "Carriage return" or other such designation, or could be omitted from a system that used a fixed code length.

The "P" key 70, that is shown in FIG. 2 of the drawing is preferably, but optionally, used for re-programming the system to accept a different code. As is conventional in the art of electronic locking mechanisms, this may be done by allowing a user to enter a new access code (which either replaces a stored access code or which becomes an additional access code) during a pre-set time interval after a previously known access code has been entered.

The system can signal the operator with steadily illuminated or flashing LEDs (FIG. 2 shows the preferred configuration for a twin. As should be apparent from the figure, a four engine aircraft would have five LEDs instead of the three that are shown), or with an acoustic "sounder" (not shown).

Communication among the various elements of the new security system can be better understood with reference to FIG. 3 of the drawing, which shows block diagrams of the KBU 30 and CJU 32 portions of a preferred embodiment of the system, as well as of a portion of an exemplar security unit 40 (it will be understood that other security units will provide the same functions for other engines as will be subsequently discussed). A microcomputer 71 that incorporates a UART 72 and that is located in the KBU 30 is the master in an inter-processor communication scheme. The KBU microcomputer 71 (In the preferred embodiment, this is a Model 80C31 made by the Intel Corporation.) also decodes input from the keys 61–70 and manages the display functions of the KBU 30.

Communication between the KBU microcomputer 71 and a microcomputer 74 in the security unit module 40 is provided by modulating a tone onto existing starter wires that are part of the factory-installed harness. This is done in a fashion that allows the aircraft's starting apparatus to function in its normal manner when the security system is disarmed. As shown in FIG. 3 the electric starter control line 50 that leads to the right engine is cut and the two ends are attached to terminals 80, 82 of the CJU 32. Closing the right engine start switch 84 provides a DC conduction path through an inductor in a tuned circuit 88 to the output part of the start wire 50—i.e., if the start relay in the right security unit is enabled by the system of the invention, current flowing from the main aircraft power supply to ground through the start switch 84 acts to operate the right engine starter motor in the normal fashion.

Sharing a conductor between power and signals is well known in the art (e.g. has been frequently suggested as a means of transmitting energy usage data from a residence to an electric utility billing center over the power lines). In applying a pulse-code-modulated tone-burst signalling system to an aircraft, there are some special considerations regarding selection of the optimal modulation frequency. Field tests on a twin engine aircraft have indicated that if the modulation frequency for carrier current signalling is set below about 25 kHz, communication is disrupted by noise arising from the aircraft's generator and from the power supply for the flashing beacon. If, on the other hand, the modulation frequency is set above about 50 kHz, excessive cross-talk occurs among the tightly bundled wires running between the cockpit and a start relay. These test results led to the selection of a preferred modulation frequency of about 31 kHz.

The signalling apparatus used in the system of the invention includes low Q tuned circuits 88, 89 that reject of choke data tone bursts from the starter relay DC control circuit; high Q circuits 90, 91 tuned to the selected data tone band of 31 kHz; and coupling capacitors 92, 94 linking data tones onto the starter control line 50. The preferred communication system is configured as a party-line, as is indicated in FIG. 3 by the parallel connection of an additional coupling capacitor 93 to couple data from the KBU microprocessor 71 onto a second engine starter control line 52. To prevent data bus loading by inactive transmitters,the tone burst drivers 95, 96 and oscillators 97, 98 are normally disconnected from the party line by switches 99, 100.

Data transmission in the preferred embodiment is done under microprocessor control by using transmit outputs of UARTs 72, 75 to couple the output of oscillators 97, 98 onto the party line. Data are received from tones that pass through an input filter 90 and are amplitude detected by a detector 101, 102. The detector, as is well known, may be implemented with an op amp, or may be a simple diode if the signal levels are high enough. Automatic gain control circuits 103, 104 are preferably used at the input to hysteresis comparators 105, 106 to set an ideal slicing level and to allow a single version of the communication system to be used with the differing amplitude modulation variations that are encountered in fitting the system to a wide variety of aircraft.

The signalling subsystem of the invention uses an asynchronous PCM protocol with one start bit, 8 data bits and one stop bit and a 300 baud data rate with one byte parity checking. A half-duplex party-line configuration is used that allows only one device to transmit at any given time, although all devices receive at all times. The KBU microprocessor 71 is programmed to be the master of the communication process, with the engine security unit microprocessor 74 acting as a slave.

As will be subsequently discussed, a code that is input via keys 61–70 may be communicated to a security unit microprocessor 74 that provides comparison apparatus for comparing the input code with a authorized access code that is stored in EEPROM 76. If the match is successful, an output line 108 of the microprocessor 74 provides a latch control signal that drives a latching electromechanical start relay 107 into an unlocked state in which the starter relay is "enabled" or effectively connected to the start switch 84. The relay 107, which is shown in FIG. 3 as being an electromechanical latching relay is more commonly implemented as an electronic latch 110 and a number of stacked power switching devices, as will be discussed with respect to FIG. 4. A preferred embodiment of the separately powered reset circuitry 109, will also be discussed in greater detail with respect to FIG. 4.

Figure 4:
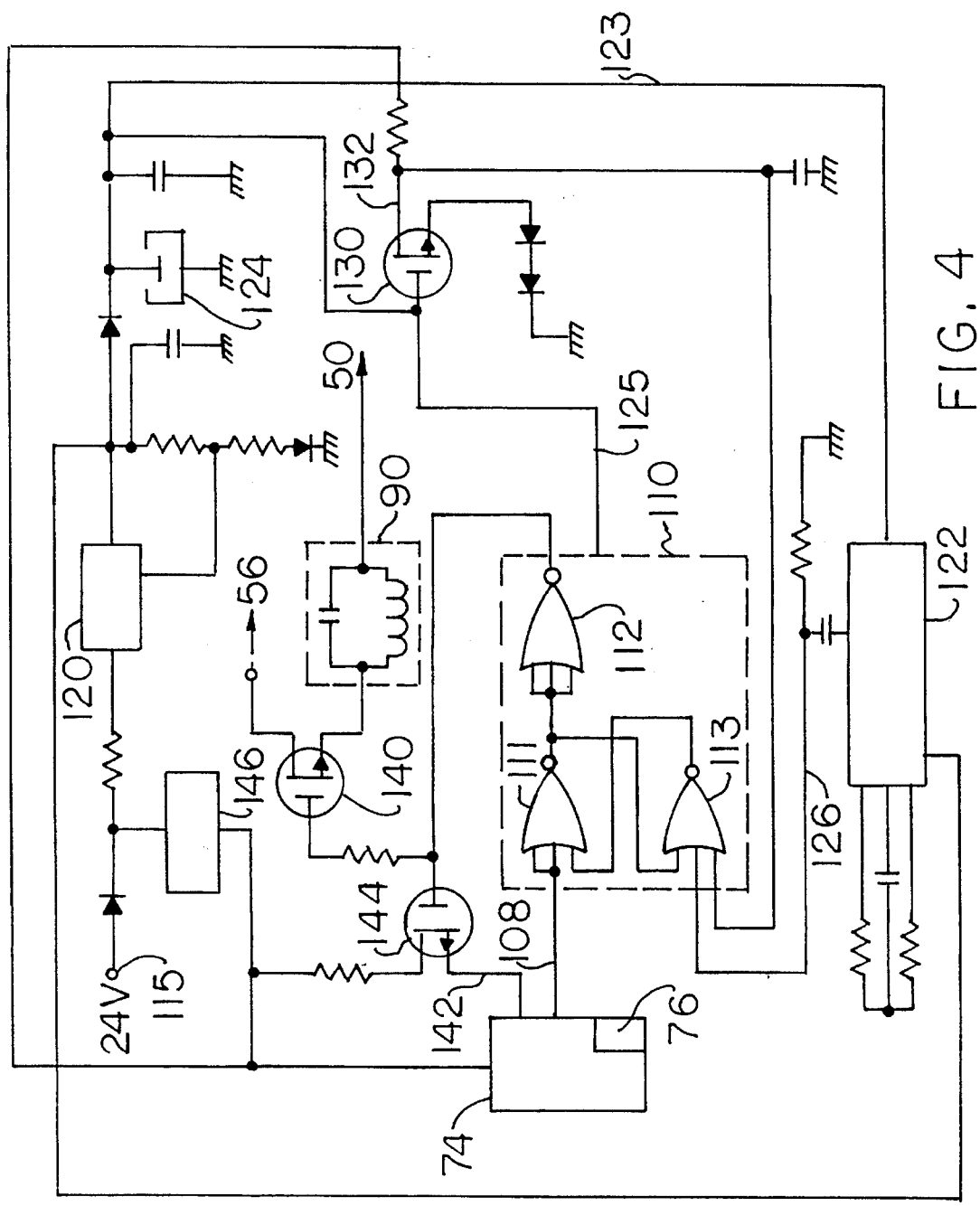
FIG. 4 of the drawing is an electrical schematic diagram of the apparatus employed to arm the security system of the invention.

Turning now to FIG. 4 of the drawing, one finds a schematic view of apparatus used to arm and disarm the security system of the invention. The security unit microcomputer 74 (In the preferred embodiment, this is substantially the same as the KBU microprocessor 71 and may be an Intel Model 80C31 microprocessor used with an Intel Model 27C64 EEPROM, or it may be an Intel 80C51, which incorporates the EEPROM in the same chip.) communicates with the master KBU microcomputer 71 to supply security unit status data, to receive keyboard input, and to set the latch 110 to an 'Unlocked' condition when the keyboard input code from the KBU microcomputer 71 matches the access code stored in the EEPROM 76. As is well known in the art, other computer memory technologies that provide for continued storage of data after the power is switched off, such as battery-backed CMOS RAM, ferroelectric NVRAM, or magnetic media could be use din lieu of the preferred EEPROM 76.

In an aircraft security system, it is critically important that the system not compromise the flight safety of the aircraft. In the present case, where the system of concern prevents starting an engine, it is vital that the system not be capable of operating while the aircraft is in flight. If an engine must be restarted in flight, the security system must not interpose itself and force the pilot to remember and enter a security code.

To provide the requisite safety, the process of arming the system of the invention is independent of the control microcomputers and of the data communication scheme. Arming is carried out according to a two level hierarchical scheme. Normally, the start-up security circuit is armed a predetermined period after the engines are shut down and remain turned off. This arming operation relies on a minimal number of electronic components that are powered by a separate exhaustible energy source. The second level of the arming hierarchy comes into play after the exhaustible energy source is drained. In this "cold start power-up" mode the circuitry shown in FIG. 4 ensures that the latch 110 is brought up in a locked status.

In the initial, powered, latching mode a flip-flop electronic latch 110 (shown in FIG. 4 as comprised of three 74HC27 NAND gates 111–113, is preferably used. When the engine is turned off, the voltage applied to a terminal 115 drops from the aircraft main power system voltage to zero. (The aircraft main power voltage normally ranges from 24 VDC when supplied by a starting battery to 28 VDC when supplied by an engine-driven generator, which may be an alternator). The corresponding drop at the output of regulator 120 initiates a count-down by a timer circuit 122 (which may be a CD 4541 programmable timer made by the RCA Corporation) that is powered, via line 123, from a local power source that is independent of the main aircraft power supply. This source is preferentially a battery-like electrical double-layer capacitor 124, with a capacitance in excess of 0.1 Farad. The preferred such device, which is sold under the name "Supercap" by Nippon Electric Corporation of America, has a capacitance of 0.22 Farad. The capacitor 124 has an estimated service life that exceed the estimated service life of the aircraft, and is therefore to be preferred to a secondary battery, which would have too short a service life, especially at eh low operating temperatures that are encountered inside an aircraft wing. It should be noted that the desirable characteristic of long service life could be supplied by other energy sources, such as the combination of a spring and an electric motor used to rewind it (e.g., an energy storage method that was used for many years for automobile dashboard clocks).

At the end of a countdown period during which the engine 20 remains off, the system is armed, or restored to the locked status in which the starter motor is effectively disabled, i.e., disconnected from the start switch 84, when the timer 122 drives an output line 126 HI and resets the latch 110 (which is also powered by the supercap 124 via line 125) by an input to NAND gate 113. The timer 122 may easily be set to a time interval value that is long enough to ensure that the aircraft is on the ground (whether or not an in-flight restart was attempted) but that is also short enough to ensure that the pilot does not leave the aircraft unattended for an appreciable time while the anti-theft system is still disarmed. As a matter of practice, equipment of the invention is made with this time interval installer-selectable to either four minutes or to one-half minute.

It may be noted that the same approach of measuring a condition and noting that it persists for a long enough interval to be sure that the aircraft is out of service could be done with other choices of measurands. For example, one could continuously monitor the status of the "weight-on-wheels" (also called a "squat") switch and determine that after some interval (e.g. 1 minute) the aircraft was out of service, rather than being involved in touch-and-go training landings. Other such "persistence measureands" that are indicative of an out-of-service status include altitude changes and an air speed indication below the rated stall speed of the aircraft. Although a variety of such measurands are selectable, the choice of the output voltage from the aircraft's main electric power system is preferred because it offers a singularly simple and reliable measurement approach that does not involve additional transducers and additional signalling paths.

The second level of the hierarchical arming system is employed if the aircraft is left unused for an appreciable period. The circuit that is shown in FIG. 4 has been found to provide an operating life of more than one day for the security units. After longer periods of time, the charge stored in the supercapacitor 124 dissipates and the circuit becomes inert. In this case, when the main battery voltage is applied to the aircraft's electrical system, the security unit controller 74 boots-up, interrogates the latch 110 via line 142 that is connected to a latch-reading field effect transistor 144 (note that transistor 144 and microprocessor 74 are both powered by the positive five volt output of a voltage regulator 146 that may be supplied by the aircraft's starting battery), finds it to be locked, and sends a "lock" status message, thus causing the KBU microprocessor 71 to report the engines as locked and to request the input of an appropriate access code. Additionally, if battery power is applied to the security unit circuitry when the capacitor 124 is fully discharged, as the voltage on the capacitor 124 rises from its initial zero volt value to about three volts, a transistor 130 begins to turn on, causing its drain voltage to go LOW. The transition from the initially HIGH voltage on the drain lead 132 is applied to a second terminal of the gate 113, thus assuring that the latch 110 powers up in the locked state.

Figure 3:
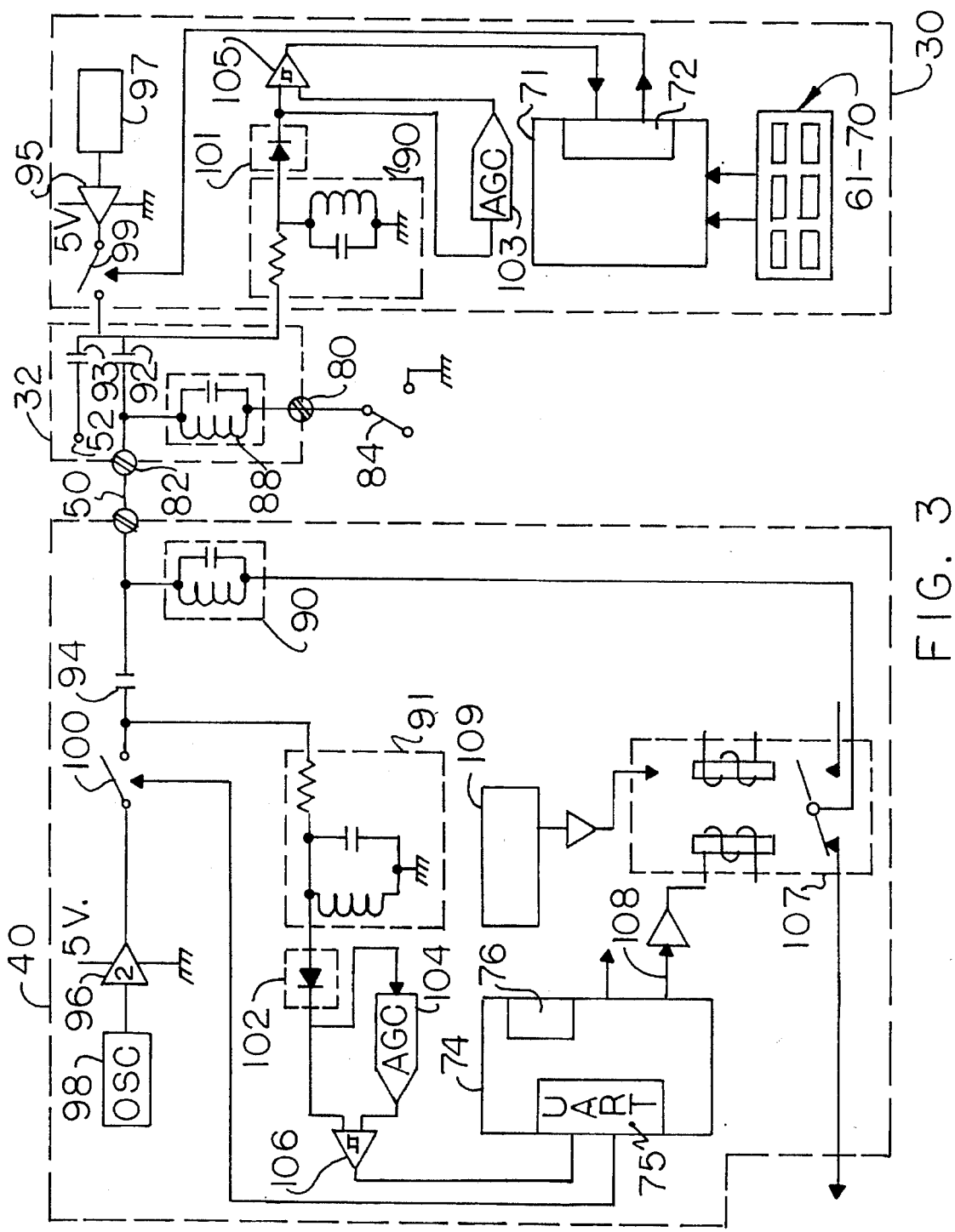
FIG. 3 of the drawing is a electrical schematic diagram showing the apparatus employed to communicate data between the cockpit and engine-area of an aircraft.

As previously described with respect to FIG. 3, if the security unit controller 74 finds that an input code matches the access code stored in EEPROM 76, it drives an output line 108 HI to reset the latch 110 into an 'unlocked' condition. When the latch 110 is unlocked a transistor 140, which is selected to be fully ON when 4.5 V is applied to its gate electrode, becomes conductive so that the usual cockpit start switch 84, which is connected via the starter line 50 and the choke circuit 90 to the source electrode of the transistor 140, can be used to operate the starter relay 56, which is connected to the drain electrode of the transistor 140.

Although the preferred embodiment of the invention uses the combination of a flip-flop and a timer depicted in FIG. 4 of the drawing, it should be noted that a wide variety of other latching mechanisms (e.g., the electromechanical latching relay 107 of FIG. 3, motor-driven mechanical switches, etc.) and timing mechanisms (mechanical escapements, etc.) could be employed.

It is also noteworthy that although the preferred embodiment of the invention controls a starter relay 56 to disable an engine by rendering it unstartable, other apparatus and engine subsystems could be used as engine disabling means. For example, one might choose to open-circuit a fuel pump, to cut-out an ignition system, or to restrict air inflow to the engine.

Figure 5:
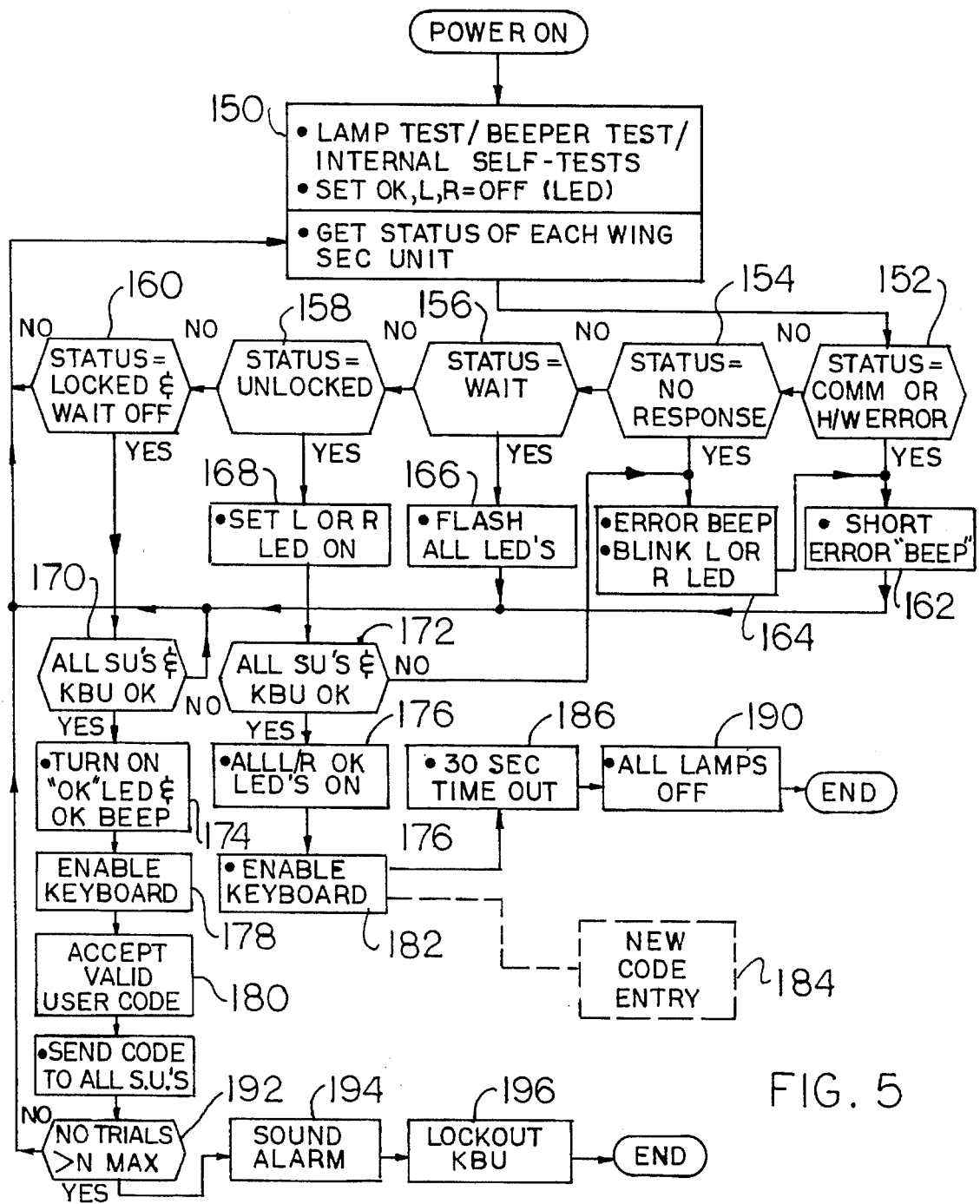
FIG. 5 of the drawing is a logic flow diagram illustrating the main process steps carried out by the keyboard/display apparatus.

Turning now to FIG. 5 of the drawing, one finds a flow chart of the main logical processes employed in the operation of the KBU microcomputer 71. At power-up the KBU computer 71 performs several initiation functions and retrieves the status of each engine from each security unit 40, 42 (in step 150) and displays these status data at the KBU 30. This is preferably done both audibly and visibly, as indicated in steps 152–176. For example, if the twin-engine KBU 30 shown in FIG. 2 receives the normally anticipated message that both engine security units 40, 42 are "locked" (step 160), the "OK" LED 61 is illuminated, both the "L" 60 and "R" 62 LEDs are turned off, and the sounder emits a sequence of two high tones (in step 174). If, on the other hand, an engine 20 is "unlocked" (step 158) the associated LED is illuminated (step 168) and the sounder emits a low tone followed by a high tone. If a "wait" code (which is be described later herein as being indicative of tampering) is received from a security unit (as shown at step 156), the "OK" 61 LED is turned off, both the "L" 60 and "R" 62 LEDs flash (in 166), and the sounder emits a sequence of low tones (162).

After displaying the system status, and pausing for a predetermined wait period if a "wait" status code was received from a security unit 40, 42, the KBU controller 71 enables the keyboard in step 178, accepts an input code in step 180 (this code is preferably a string of one to six digits with the string terminated by a stroke of the "E" key 69) and transmits that input code to the security units 40, 42 via the party line communication approach described above. The KBU controller 71 subsequently displays whatever status messages are received from the various security units and may, as shown in steps 182–190, allow input of a new access code.

Figure 6:
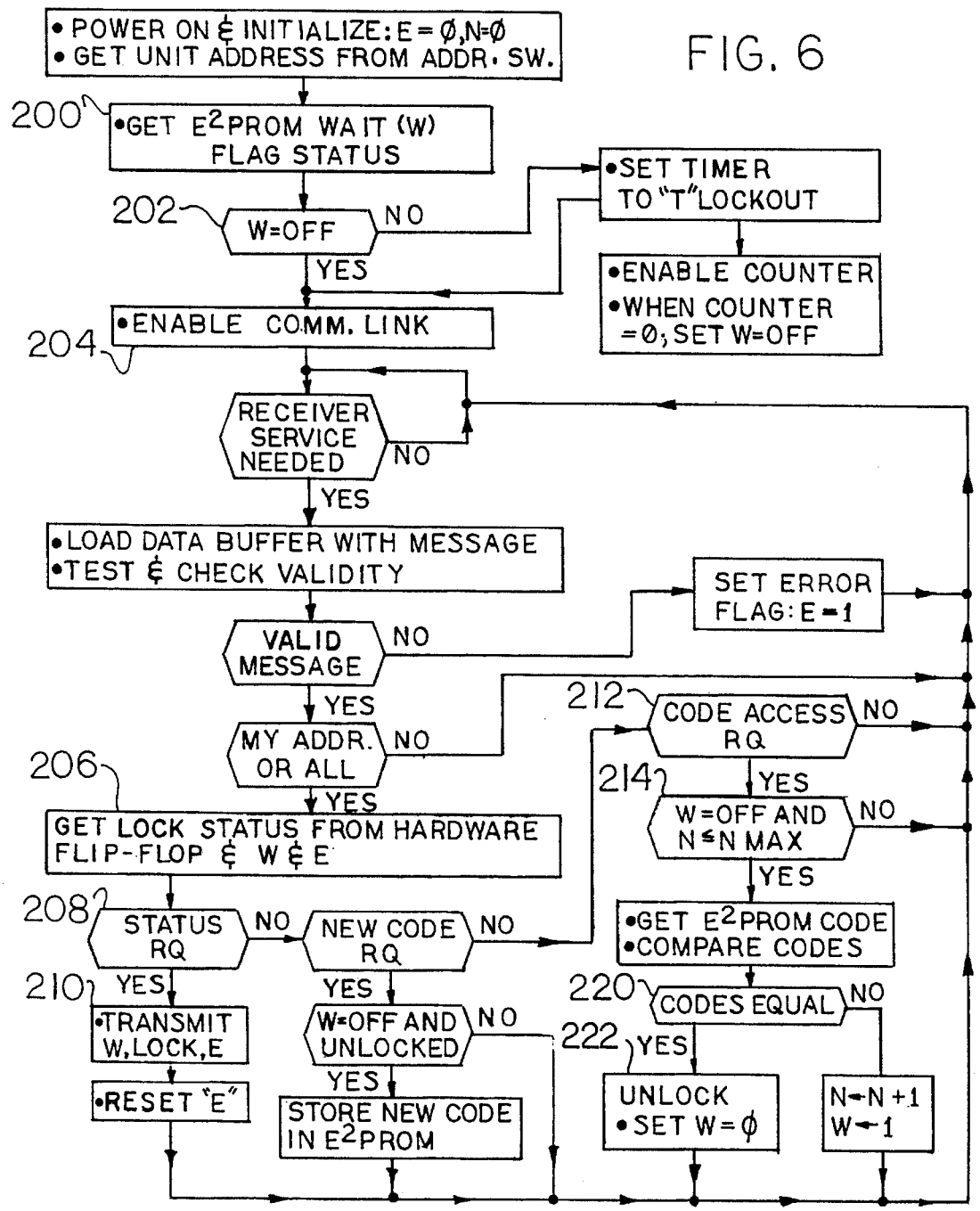
FIG. 6 of the drawing is a logic flow diagram showing the main process steps carried out by security unit apparatus of the invention.

Turning now to FIG. 6 of the drawing, one finds a flowchart presenting the essential control features of a security unit (e.g. 40). When the security unit controller 74 initializes, it first retrieves a "wait" status message that is stored in non-volatile memory, e.g. EEPROM 76, as shown in step 200. If this flag is not set (step 202), as is usually the case, the controller enables communication in step 204 and reads the status of the latch hardware 110 in step 206. If the security unit controller 74 determines, in step 208, that it has received a status request that is addressed to it, it transmits its current lock/unlock, wait flat, and error flag status in step 210. When an input code is received from the KBU controller 71 (step 212), the security unit controller 76 first determines that there are no "wait state" violations and that there has been no excessive number of attempts to unlock the system (in step 214). It then proceeds to retrieve the access code from EEPROM 76 and compare it with the input code. If a match is found in step 220, the latch 110 is unlocked and the wait flag is turned off in step 222. As previously discussed, once the system is unlocked the pilot can start-up the engines by manually operating the start switches 84, 86, to close the main starter motor relay and thereby cause the starter motor to engage and turn the engine.

If an erroneous code is input, the comparison in step 220 results in the wait flag being set and an "attempt counter" being incremented by the security unit controller 76. When the KBU computer 71 retrieves status data, it displays an error message to the user. Preferably, if a second incorrect code is entered, a more severe message is provided. In the preferred system, if a third sequential incorrect code has been input, the KBU controller 71 will turn on a siren 59 and disable the keyboard (i.e. refuse to accept input from the keyboard) for a predetermined time (steps 192–196 of FIG. 5).

Since a thief may try to avoid the time-out provision of the system by turning the aircraft main power off and restarting the sequence, after each incorrect code entry in the preferred system a 'wait' status flag is set and stored in non-volatile memory 76 at a security unit 40. If the unit 40 'wakes up' with a 'wait' flag stored in a security unit's EEPROM (e.g. step 202 of FIG. 6), when the KBU computer 71 polls that security unit, it will receive the 'wait' message and thereupon enter a lock-out state for the predetermined time as previously discussed with reference to step 192–196 of FIG. 5.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

What is desired to be secured by Letters Patent is:

1. An anti-theft system installed on an aircraft comprising a pressurized cabin separated from other portions of the aircraft by a plurality of bulkheads, a main electric power system supplied by a starting battery or by a generator driven by an engine, and a starter control line having a first end connected to a start switch within the cabin and a second end connected to a starter relay located intermediate the cabin and the engine, the engine being startable by an electric starter motor powered by the main electric power system when the starter relay operates the starter motor, the system installed without penetrating any of the bulkheads, the system comprising:

operator-identification apparatus situated within the cabin, the operator-identification apparatus generating an input code, the operator-identification apparatus operatively connected to a first communication apparatus situated within the cabin and in turn operatively connected to the first end of the starter control line, and a second communication apparatus connected to the second end of the starter control line, the second communication apparatus controlling a starter relay control apparatus having a first, locked, state in which the relay is prohibited from operating the starter motor, the starter relay control apparatus having a second, unlocked, state in which the relay operates the starter motor wherein the first communication apparatus sends a first code signal, corresponding to the input code, as an alternating electric voltage on the starter control line, to the second communication apparatus, the second communication apparatus unlocking the starter relay control apparatus only if the first code signal matches an access code stored in the second communication apparatus.

2. The system of claim 1 wherein the alternating voltage has a frequency between 25 and 50 kHz.

3. The system of claim 2 wherein the alternating voltage has a frequency of 31 kHz.

4. The system of claim 1 wherein the starter relay control apparatus comprises voltage measurement apparatus sensing a voltage output of the main electrical power system, timer apparatus responsive to the voltage measurement apparatus, the timer apparatus supplying a latch control signal to a latch apparatus at the end of an interval of predetermined duration during which the voltage output has a persistent value of zero volts, and the latch apparatus acting responsive to the latch control signal to place the starter relay control in the locked state.

5. The system of claim 4 wherein the timer apparatus and the latch apparatus are powered by an exhaustible electrical power source separate from the main electrical power system.

6. The system of claim 1 wherein the aircraft is a fixed-wing airplane having two or more wings, the airplane having a plurality of said electrically started engines, each of the engines operatively connected to a separate start switch by a separate starter control line, and wherein each of the starter control lines comprises a wire disposed within one of the wings.

7. An anti-theft system installed on an aircraft, the aircraft comprising a cabin, a bulkhead separating the cabin from an engine, a main electric power system supplied by a starting battery or by a generator driven by the engine, and a starter control line having a first end in the cabin and a second end adjacent a starter relay controlling an electric starter motor powered by the main electric power system to engage and turn the engine, the engine being startable if the starter relay is enabled, the engine being unstartable if the starter relay is disabled, the system comprising, sensing means sensing a persistence measurand indicating an out-of-service status, timing apparatus responsive to the sensing means and supplying a first latch control signal to a latch apparatus after a predetermined time interval during which the out-of-service status persists, the latch apparatus located intermediate the cabin and the starter relay and operably connected to the starter relay, the latch apparatus responsive both to the first latch control signal and to a second latch control signal, the latch apparatus disabling the starter relay in response to the first latch control signal, the latch apparatus enabling the starter relay in response to the second latch control signal, operator-identification apparatus within the cabin, the operator-identification apparatus generating an input code and transmitting the input code over the starter control line to a comparison apparatus, the comparison apparatus receiving the input code, comparing the input code with an access code stored in the comparison apparatus, and supplying the second latch control signal to the latch apparatus if the input code matches the stored access code.

8. The system of claim 7 wherein the aircraft comprises a plurality of engines, each of the engines separately equipped with a said electric starter motor, a said starter motor relay and a said latch apparatus.

* * * * *